(12) United States Patent
Su et al.

(10) Patent No.: US 8,919,480 B2
(45) Date of Patent: Dec. 30, 2014

(54) MOTORCYCLE

(75) Inventors: Chinglong Su, Shizuoka (JP); Chingho Lee, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 235 days.

(21) Appl. No.: 13/599,106

(22) Filed: Aug. 30, 2012

(65) Prior Publication Data

US 2013/0068551 A1 Mar. 21, 2013

(30) Foreign Application Priority Data

Sep. 16, 2011 (CN) .......................... 2011 1 0281111

(51) Int. Cl.
| | | |
|---|---|---|
| *F02M 35/16* | (2006.01) | |
| *B62M 7/02* | (2006.01) | |
| *B62K 11/00* | (2006.01) | |
| *B62M 7/04* | (2006.01) | |
| *F02M 35/024* | (2006.01) | |

(52) U.S. Cl.
CPC *B62M 7/04* (2013.01); *B62K 11/00* (2013.01); *F02M 35/024* (2013.01); *F02M 35/162* (2013.01)
USPC ......................................... 180/219; 180/68.3

(58) Field of Classification Search
CPC .......... B62K 11/00; B62M 7/00; B62M 7/02; F02M 35/02; F02M 35/162
USPC ........................................ 180/219, 227, 68.3
See application file for complete search history.

(56) References Cited

U.S. PATENT DOCUMENTS

| | | | | |
|---|---|---|---|---|
| 8,302,722 | B2 * | 11/2012 | Fujiyama ....................... | 180/219 |
| 2002/0027033 | A1 * | 3/2002 | Minami et al. ................ | 180/225 |
| 2005/0045400 | A1 * | 3/2005 | Osada ........................... | 180/219 |
| 2008/0135317 | A1 * | 6/2008 | Kajiwara et al. ............. | 180/68.1 |
| 2009/0165448 | A1 * | 7/2009 | Mitsukawa et al. ............ | 60/299 |
| 2010/0078241 | A1 * | 4/2010 | Maeda et al. ................ | 180/68.3 |
| 2011/0120796 | A1 * | 5/2011 | Kuramochi et al. .......... | 180/219 |

FOREIGN PATENT DOCUMENTS

| | | |
|---|---|---|
| CN | 1101400 A | 4/1995 |
| CN | 2795464 Y | 7/2006 |
| CN | 101333987 A | 12/2008 |
| EP | 2 009 273 A1 | 12/2008 |
| JP | 2003-54469 A | 2/2003 |
| TW | 571023 B | 1/2004 |

OTHER PUBLICATIONS

"NEX 125 Motocycle Maintenance Manual", Jan. 2009.
Official Communication issued in corresponding Taiwanese Patent Application No. 100133503, mailed on Apr. 1, 2014.
Official Communication issued in corresponding Chinese Patent Application No. 201110281111.0, mailed on Jul. 31, 2014.

* cited by examiner

*Primary Examiner* — Anne Marie Boehler
(74) *Attorney, Agent, or Firm* — Keating & Bennett, LLP

(57) ABSTRACT

A motorcycle includes a vehicle body frame which extends in a front-rear direction of the vehicle, an engine unit that generates power that drives the motorcycle, a seat on which the rider sits, a storage box disposed below the seat, a fuel tank that stores fuel needed by the engine unit, and an air filter disposed above the engine unit to filter the air needed by the engine unit and includes an air intake hose to introduce air. The fuel tank is disposed below the seat and is located in front of the storage box. Moreover, the fuel tank is mounted on the vehicle body frame, and the air intake hose extends from the air filter toward an area between the fuel tank and the storage box such that a air inlet thereof is located in a space between the fuel tank and the storage box.

10 Claims, 8 Drawing Sheets

MOTORCYCLE

BACKGROUND OF THE INVENTION

1. Field of the Invention

The present invention relates to a motorcycle. In particular, the present invention relates to an air intake structure for an air filter included in a motorcycle engine.

2. Description of the Related Art

The engine of a motorcycle is the source of its power. An engine needs air to carry out combustion. Therefore, the engine of a motorcycle is configured upstream with a fuel injection device or a carburetor for providing the mixture of air and fuel that the engine needs to carry out combustion within the cylinders. The fuel injection device or carburetor must provide the engine with appropriate mixtures at appropriate times given various engine environments and factors such as idling, low speed, and high speed. However, the air in the external environment in which motorcycles are operated usually carries a lot of muddy water or dust. If these impurities are sucked into the engine, they might result in poor engine combustion efficiency and may even damage the engine. Therefore, to solve this problem, an air filter is always installed in the air intake structure of the motorcycle engine in order first to filter out the various impurities described above from the air. Only then is the filtered air, passing through manifold inlets, introduced through the fuel injection device or carburetor into the engine so that it can undergo combustion.

All air filters have an air inlet for introducing external air into the air filter. FIG. 7 shows a diagram of the air intake structure of a conventional motorcycle air filter 131. The air filter 131 is disposed above the motorcycle engine. As shown in FIG. 7, in a conventional engine intake structure, the air inlet 132 is formed with an opening which is in the front end of the main body of the air filter 131 and which is oriented directly toward the front of the vehicle. Therefore, the air inlet 132 easily sucks in muddy water or dust from the front while the motorcycle is being operated. In addition, because the air inlet 132 is relatively close to the ground and is installed near the rear wheel of the vehicle, muddy water, dust, or other such impurities that are splashed up from the ground during vehicle operation are extremely likely to be drawn into the air filter together with the air. In particular, muddy water, etc. is easily splashed through the air inlet into the air filter when the vehicle travels down a stretch of road that is full of puddles. The problem has been solved in conventional engine air intake structures by adding a shielding portion 133 located above, below, or around the air inlet to prevent various impurities from infiltrating the interior of the air filter 131 through the air inlet. However, in such a structure, it is necessary to add the shielding portion 133 at the air inlet 132. Since the air filter 131 is installed low on the frame of the rear half of the vehicle body, where there are elements such as the motorcycle's vehicle body frame, the engine unit including the crankcase and the transmission case, ducts, and the rear mud flap, the space available for installation is extremely limited in this area. Thus, the addition of the shielding portion 133 at the air inlet 132 of a conventional air filter 131 results in the occupation of more space, with the result that the motorcycle's design becomes complex, which, in turn, leads to increases in the size of the vehicle body. In addition, because this area is near the rear wheel of the motorcycle, the muddy water, dust or other impurities that are sprayed up by the rear wheel when the motorcycle is traveling at high speeds will still easily avoid the shielding portion 133 and enter the air filter through the air inlet. As a result, the air filter 131 still might suck in impurities.

In addressing this type of problem, the conventional art has structures wherein a shielding portion is not used at the air inlet. Please refer to FIG. 8. FIG. 8 is a diagram that shows another air intake structure of a conventional motorcycle air filter. As shown in FIG. 8, the conventional air intake structure entails installing the air filter 100 behind the storage box 104 above the motorcycle engine and mounting the air filter 100 with fasteners such as bolts, or welding it, on the left-side and right-side vehicle frames 101 and the transverse tube 102. Then, above the transverse tube 102, an air inlet 103 oriented toward the rear of the vehicle is installed on top of the air filter 100.

However, in the air intake structure of the conventional engine air filter arranged as shown in FIG. 8, the air inlet 103 opens toward the rear of the vehicle and is installed near the rear wheel. Therefore, when the vehicle is traveling forward at high speeds, impurities such as muddy water or dust which are carried by the upper portion of the rear side of the rear wheel are sprayed forward and upward by the rapid rotation of the rear wheel. As a result, the concern remains that the air inlet 103 may suck in a considerable amount of impurities. In addition, since the air filter 100 is installed behind the motorcycle's storage compartment 104, the storage compartment 104 is compressed, with the result that the storage compartment 104 has less space available for storage.

Both the motorcycle industry and riders long for effective improvements and solutions to the various problems with the air intake structure of the conventional motorcycle engine air filters described above in order that the aforementioned problems with impurities easily entering the air filter and thus affecting vehicle engine performance may be solved.

However, the internal vehicular space of a motorcycle is itself already very limited and, given the trend toward reduced weight and size, the space available for installing a shielding portion that will effectively prevent impurities from entering the air filter from the air filter's air inlet is even more limited. Therefore, to maintain long-lasting, superior engine performance, the installation of a good air intake structure on a motorcycle requires two things: first, that no more of the limited internal space of the motorcycle be used up; second, that impurities can be truly and effectively prevented from entering the air filter through the air inlet of the air filter. This is absolutely not a simple matter. Therefore, in the quest to fully satisfy both requirements, designers and manufacturers in the industry have long had difficulty in developing and commercializing an effective solution.

SUMMARY OF THE INVENTION

After thinking long and hard about the above-described problems with the air intake structures of conventional air filters and devoting himself to research and development, the inventor of the present invention discovered and developed a completely new solution to the problems described above which resulted in the development of the present invention. Accordingly, preferred embodiments of the present invention provide a motorcycle including an air intake structure of an air filter, wherein the air intake structure of the air filter not only does not occupy more of the limited space that needs to be guaranteed for the interior of the motorcycle, but also can truly and effectively prevent various impurities from entering the air filter through the air inlet of the air filter and thus respond to riders' requirements relating to engine life and operating performance.

According to a first preferred embodiment of the present invention, a motorcycle comprising: a vehicle body frame that extends in a front-rear direction of the vehicle; an engine unit that is suspended on the vehicle body frame and generates power that drives the motorcycle; a seat that is supported by the vehicle body frame and that provides seating for a rider; a storage box that is disposed below the seat; a fuel tank that stores fuel needed by the engine unit; left and right side vehicle covers that are disposed on left and right sides of the motorcycle and cover at least a portion of the storage box from the left and right sides of the motorcycle; and an air filter that is disposed above the engine unit to filter air needed by the engine unit, and includes an air intake hose to introduce air; wherein the fuel tank is disposed below the seat and is located in front of the storage box; the fuel tank is mounted on the vehicle body frame; and the air intake hose extends from the air filter toward an area between the fuel tank and the storage box such that a air inlet thereof is located in a space enclosed by the fuel tank, the storage box, and the left and right side vehicle covers.

According to the above-described construction of a first preferred embodiment of the present invention, as a result of locating the fuel tank in front of the storage box and mounting it on the vehicle body frame and arranging the air intake hose to extend from the air filter toward between the fuel tank and the storage box such that the air inlet is located in the space enclosed by the fuel tank, the storage box, and the left- and right-side vehicle covers, it is not necessary to set aside space for installing a shielding member in the area (which has extremely limited space available for installation) near the air filter. In addition, since it is not necessary to move the air filter into an area that would compress the storage space of the storage box, the space between the fuel tank and the storage box can be used for the air intake hose. Moreover, the space between the fuel tank and the storage box is far from the rear wheel and is better able to truly prevent various impurities from entering the air filter through the air inlet of the air filter. It thus increases engine life and ensures operating performance.

According to a second preferred embodiment of the present invention, the vehicle body frame includes left and right side vehicle frames located on the left and right sides, respectively, of the motorcycle and extending in the front-rear direction of the vehicle and a lateral brace connecting the left and right side vehicle frames and being supported by the left and right side vehicle frames, the fuel tank being mounted on the lateral brace.

According to the above-described construction of a second preferred embodiment of the present invention, by including a lateral brace connecting the left- and right-side vehicle frames and being supported by the left- and right-side vehicle frames in the vehicle body frame, one can easily and stably mount the fuel tank on the lateral brace.

According to a third preferred embodiment of the present invention, the motorcycle further comprises a case mounted on the lateral brace, the air intake hose being supported by the case, and the air inlet opening into the space between the lateral brace and the case.

According to the above-described construction of a third preferred embodiment the present invention, as a result of having the air intake supported by the case and by causing the air inlet to open into the space between the lateral brace and the case mounted on the lateral brace, one can keep the air inlet in a stable state and, by using the shield of the lateral brace and the case, be better able to truly prevent various impurities from entering the air filter from the air inlet of the air filter.

According to a fourth preferred embodiment of the present invention, a top portion of the case has an open-face shape that substantially corresponds to a shape of at least a portion of the lateral brace when the motorcycle is viewed from above, and at least one ventilation hole for ventilation is provided on the lateral brace.

According to the above-described construction of the present invention, because the case is arranged so that its top includes an open-face shape that roughly corresponds to the shape of at least a portion of the lateral brace when viewed from above, it is possible to provide a structure such that the case can be more easily mounted on the cross-wise piece, and it is easier to form a space that is sealed better below and on the sides so that air is introduced only through the ventilation hole provided on the lateral brace. Therefore, it is better able to truly prevent various impurities that come from below from entering the air filter through the air inlet of the air filter.

According to a fifth preferred embodiment of the present invention, shapes of the case and the lateral brace define a shape having left and right end portions on the left and right sides of the motorcycle that are wider than a middle portion when the motorcycle is viewed from above.

According to the above-described construction of a fifth preferred embodiment of the present invention, because the case and the lateral brace define the shape described above, one can, on the one hand, bore mounting holes in the wider left and right end portions to mount the rear end of the fuel tank, while designing the middle portion of the lateral brace to have a narrower shape so as to reduce its weight.

According to a sixth preferred embodiment of the present invention, the motorcycle further comprises a case mounted on the storage box, the air intake hose being supported by the case, and the air inlet opening into a space inside the case.

According to the above-described construction of a sixth preferred embodiment of the present invention, because a case that supports the air intake hose is mounted on the storage box and the air inlet is arranged to open into the space inside the case, it is possible to keep the air inlet in a stable state and to use the case for shielding so as to be better able to truly prevent various impurities from entering the air filter through the air inlet of the air filter.

According to a seventh preferred embodiment of the present invention, the motorcycle further comprises a case mounted on at least one of the left and right side vehicle covers, the air intake hose is supported by the case, and the air inlet opening into the space inside the case a case is mounted on at least one of the left- and right-side vehicle covers, the air intake hose is supported by the case, and the air inlet opens into the space inside the case.

According to the above-described construction of a seventh preferred embodiment of the present invention, as a result of mounting a case, which supports the air intake hose, on at least one of the left- and right-side vehicle covers and causing the air inlet to open into the space inside the case, it is again possible to keep the air inlet in a stable state and to use the case for shielding so as to be better able to truly prevent various impurities from entering the air filter from the air inlet of the air filter.

According to an eighth preferred embodiment of the present invention, the motorcycle further comprises a dust proof rubber pad arranged behind the case and to hang from the case.

According to the above-described construction of an eighth preferred embodiment of the present invention, as a result of installing a dust proof rubber pad behind the case and hanging it from the case, one is better able to truly prevent impurities sprayed up by the rear wheel from entering the space between the case and the lateral brace. In addition, by using a pad of soft materials, one can easily install the dust proof rubber pad within the limited space between the various parts that are installed inside the motorcycle without depriving other parts of installation space or the storage box of storage space.

According to a ninth preferred embodiment of the present invention, a rib plate is arranged in the case to extend in the front-rear direction of the vehicle.

According to the above-described construction of a ninth preferred embodiment of the present invention, as a result of a rib plate provided in the case extending in the front-rear direction of the vehicle, the case can be assured of having the necessary strength even if it is made from lightweight materials.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are described below in detail in light of the drawings.

Figure 1:
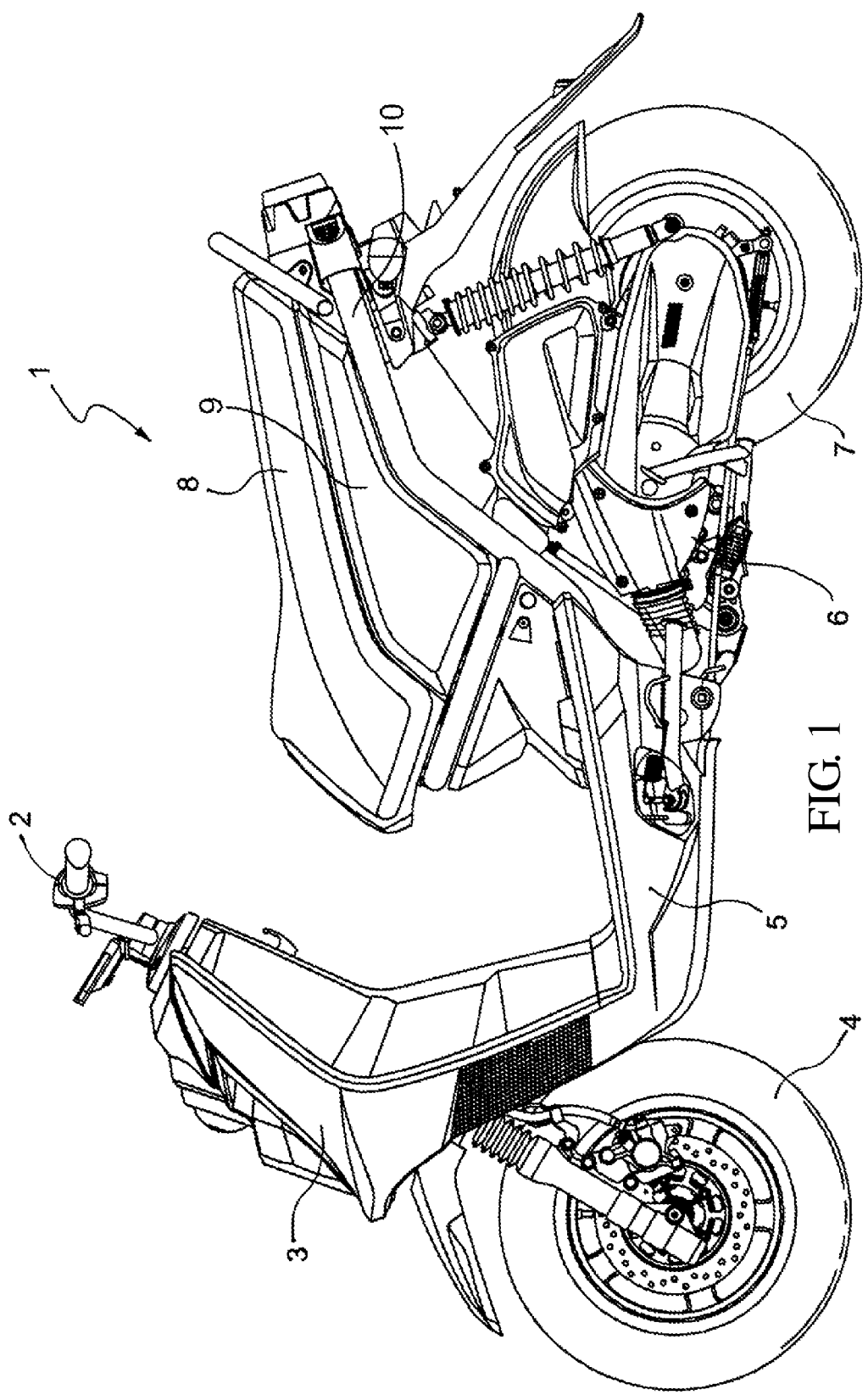
FIG. 1 is a lateral view of a motorcycle according to a preferred embodiment of the present invention.
Figure 2:
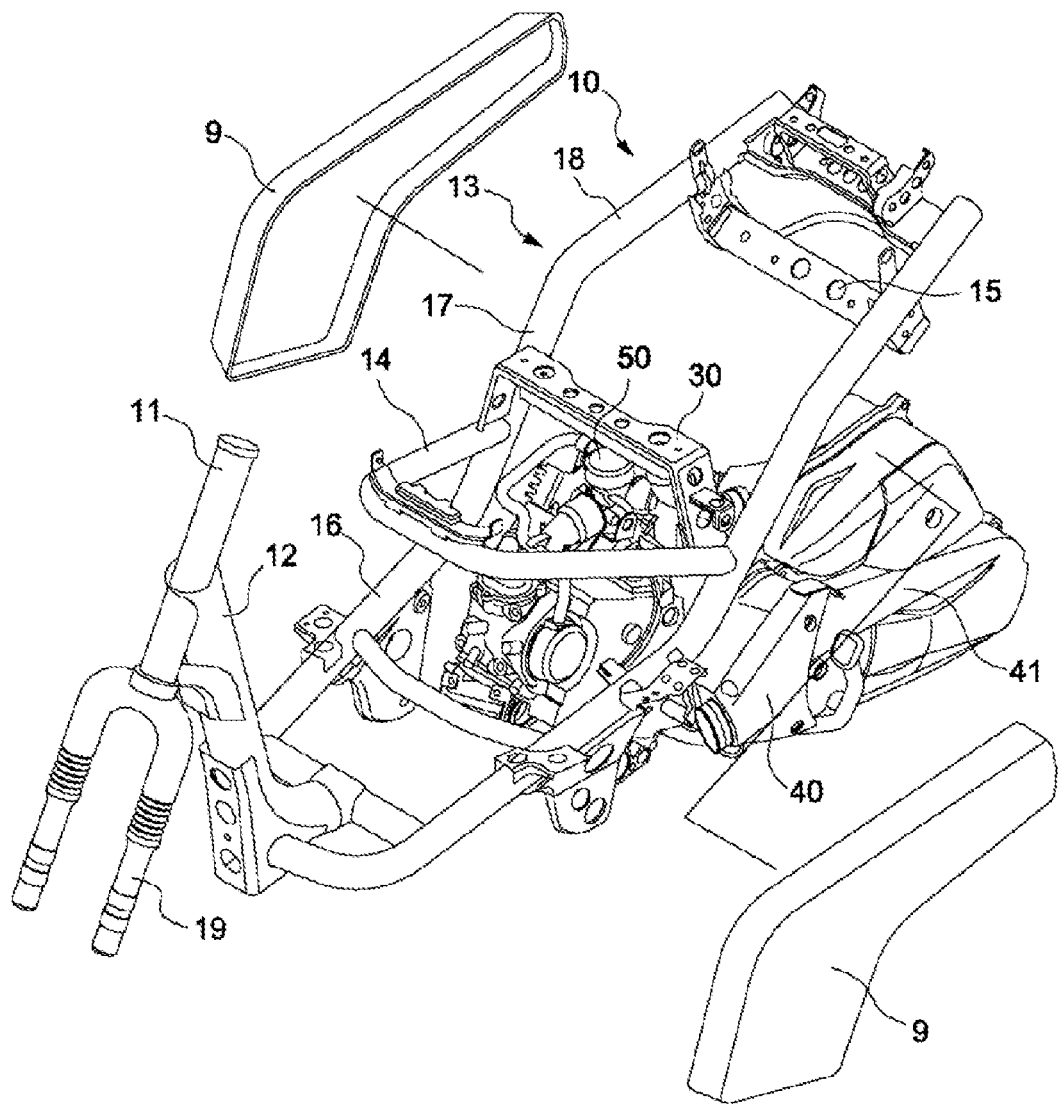
FIG. 2 is a three-dimensional drawing of the vehicle body frame of the motorcycle according to a preferred embodiment of the present invention.

First refer to FIGS. 1 and 2. FIG. 1 is a lateral view of a motorcycle 1 according to a preferred embodiment of the present invention. FIG. 2 is a three-dimensional drawing of the vehicle body frame 10 of the motorcycle 1 according to a preferred embodiment of the present invention.

As shown in FIG. 1, the motorcycle 1 of a preferred embodiment of the present invention includes left and right steering handles 2, a vehicle cover 3, a front wheel 4, a footrest board 5, a swing-type engine unit 6, a rear wheel 7, a seat 8, and left- and right-side vehicle covers 9 as its main components. The swing-type engine unit 6 includes cylinders (not shown in the drawing) and a transmission (not shown in the drawing) that conveys power generated by the engine to the rear wheel 7. The engine unit 6 is suspended from the vehicle body frame 10 and generates the power that drives the motorcycle 1.

In addition, although FIG. 1 displays a preferred embodiment of the present invention as a motorcycle 1, application of the present invention is not limited to motorcycles and can be any type of vehicle. The engine air intake structure according to a preferred embodiment of the present invention can also be applied to appropriate places on the vehicle body frames of other types of motorcycles, such as manual transmission motorcycles and motorized vehicles, to obtain the advantageous effects of the present invention. ATVs (All-Terrain Vehicles) and snowmobiles are examples of such motorized vehicles to which various preferred embodiments of the present invention are applicable.

Furthermore, FIG. 2 shows the vehicle body frame 10 in a preferred embodiment of the present invention after the vehicle cover 3, left- and right-side vehicle covers 9, seat 8, and other parts have been detached from the motorcycle 1. As shown in FIG. 2, the vehicle body frame 10 according to a preferred embodiment of the present invention includes a steering column 11 which supports the left and right steering handles 2, a front frame 12 which extends at an angle from below the steering column 11 roughly toward rear-bottom of the vehicle, left- and right-side vehicle frames 13 which begin roughly from the base of the front frame 12 and extend along the left and right sides, respectively, of the vehicle in a front-rear direction of the vehicle and in parallel toward the rear of the vehicle, a lateral brace 30 connecting the left- and right-side vehicle frames 13 and being supported by the left- and right-side vehicle frames 13. Preferably, the lateral brace 30 is roughly in the shape of a door frame.

Furthermore, the left- and right-side vehicle covers 9 are installed on the left and right sides, respectively, of the motorcycle 1 and laterally cover the left and right sides, respectively, of the motorcycle 1. The left- and right-side vehicle frames 13 include a footrest frame 16 that supports the footrest board 5, a rising-segment frame 17 which extends upward at an angle from the footrest frames 16 toward the rear of the motorcycle, and seat rail frames 18 extending from the rising-segment frame 17 toward the rear of the motorcycle 1 and supporting the seat 8. In addition, a projecting frame 14 which is installed roughly at the center of the rising-segment frames 17 is roughly shaped like a door frame, and projects anteriorly in a front-rear direction of the vehicle. In the present preferred embodiment, the lateral brace 30 is installed preferably at the junctions of the rising-segment frames 17 and the projecting frame 14. The lateral brace 30 can be easily installed and be provided with stable support. In addition, as a result of installing the projecting frame 14, one can then install, within the body of the vehicle, a fuel tank 21 and other internal parts that are behind the projecting frame 14 and protected by it.

In addition, the steering column 11 is pivotally provided with a rotatable front fork 19 at its lower end. Both tines of the front fork 19 can jointly and rotatably support the front wheel 4. A bracket 15 shaped like an upside down door may also be added between the left- and right-side vehicle frames 13 of the vehicle body frame 10. In addition to being able to strengthen the overall vehicle body frame 10 by bearing impacts from the left and right sides of the vehicle, the upside-down-door-shaped bracket 15 can support and protect the storage box 20 that is installed on it.

The engine unit 40 is the power unit that generates the power that drives the motorcycle 1. The engine unit 40 is supported by the vehicle body frame 10 roughly in the center of the motorcycle 1 in a front-rear direction of the vehicle. The driving power which it generates is transmitted to the rear wheel 7 and then drives the motorcycle 1. The driving power generated by the engine unit 40 passes through the transmission 41 and is transmitted to the rear wheel 7, and while the vehicle is operating, the rear wheel 7 and the engine unit 40 can sway up and down from fulcrums, which are the points of support on the vehicle body frame 10.

The motorcycle 1 according to a preferred embodiment of the present invention further includes an electronically controlled fuel injection device 50, which includes a throttle valve and a fuel nozzle. The fuel injection device 50 receives filtered air from the air delivery hose 62 of the air filter 60, and the volume of air that is to be delivered into the engine is regulated by the throttle valve. The air subsequently enters the manifold inlet, and the appropriate fuel is provided into the manifold inlet from the fuel nozzle installed on the manifold inlet, as controlled by electronic control units such as a vehicle operating computer, so that it mixes with the air in the manifold inlet. Then, the air and fuel mixture is supplied to the device of the engine unit 40. In addition, the present invention is not limited to electronically controlled fuel injection devices, but can also be applied to devices that use carburetors.

Figure 3:
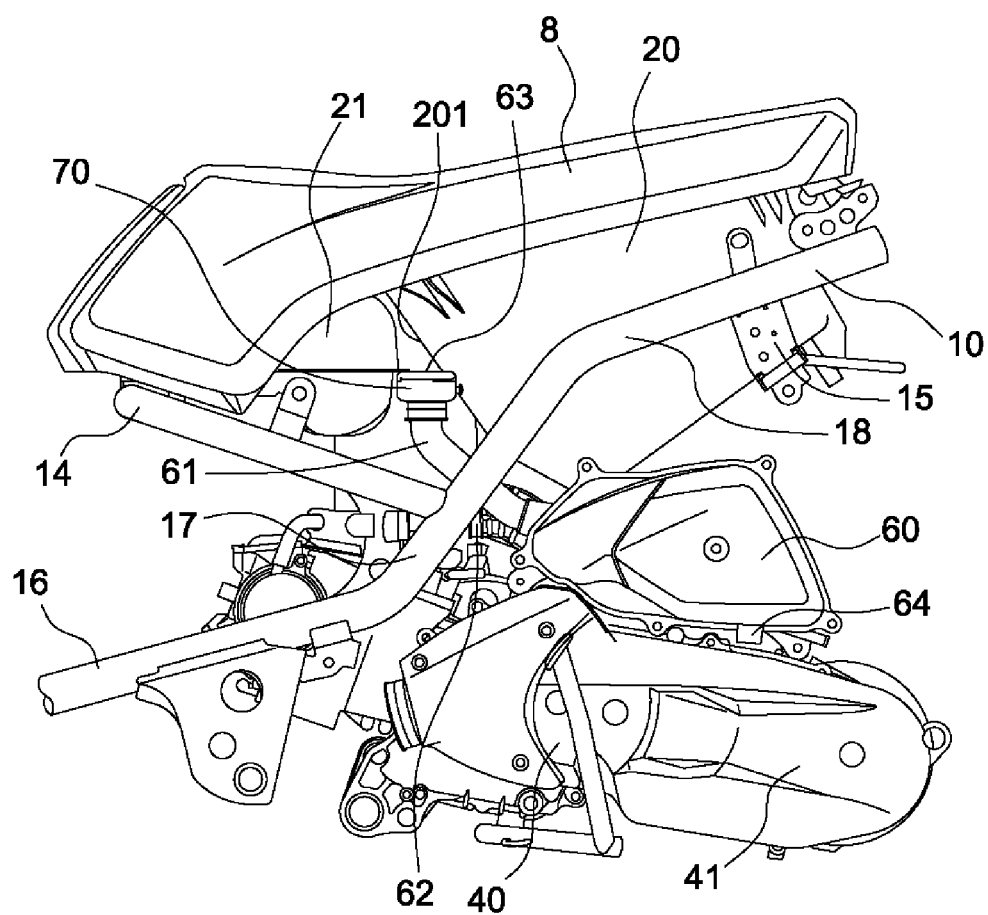
FIG. 3 is a partial diagram showing the motorcycle according to a preferred embodiment of the present invention after some parts have been detached.

Next, please refer to FIG. 3. FIG. 3 is a partial diagram showing the motorcycle 1 according to a preferred embodiment of the present invention after some parts have been detached. In order to display how the air intake hose 61 of the air filter 60 relates to the space where it is installed, FIG. 3 does not show the lateral brace 30. As shown in FIG. 3, the storage box 20 is disposed below the seat 8 of the motorcycle 1 according to a preferred embodiment of the present invention. The storage box 20 can be used to store helmets or other items. The storage box 20 is installed below the seat 8 and is supported by the vehicle body frame 10. In addition, in a preferred embodiment of the present invention, the fuel tank 21 of the motorcycle 1 is also preferably installed under the seat 8 and is disposed in front of the storage box 20.

As shown in FIG. 3, when the vehicle is viewed laterally, the space encompassed by the seat rail frames 18, the projecting frame 14, and the seat 8 is for disposing the left- and right-side vehicle covers 9. In the present preferred embodiment, the left- and right-side vehicle covers 9 are shaped such that, when disposed on the space, the covers 9 can cover at least a portion of the storage box 20 and at least a portion of the fuel tank 21 from the left and right sides of the motorcycle 1 when the vehicle is viewed laterally. Moreover, the covers 9 can cover the air inlet 63 of the air intake hose 61, which are described below.

In the present preferred embodiment, the front end surface 201 of the storage box 20 is shaped such that, when the vehicle is viewed laterally, it is oriented from the upper end toward the lower rear of the vehicle in a slope to the lower end. Thus, it is possible to provide a space between the storage box 20 and the fuel tank 21 which, when the vehicle is viewed laterally, is shaped roughly as a triangle, narrower at the top and wider at the bottom. This could facilitate extending the air intake hose 61 of the air filter 60 from below into, and installing the below-described case 70 within the triangular space. In addition, the front end surface 201 of the storage box 20 can be arranged such that, for example, when the vehicle is viewed laterally, it is oriented from the upper end toward below the vehicle and extends to roughly above and behind the case 70 and then changes direction above the case 70 and extends toward the rear of the vehicle in the shape of stairs so as to further expand the storage space of the storage box 20.

Figure 4:
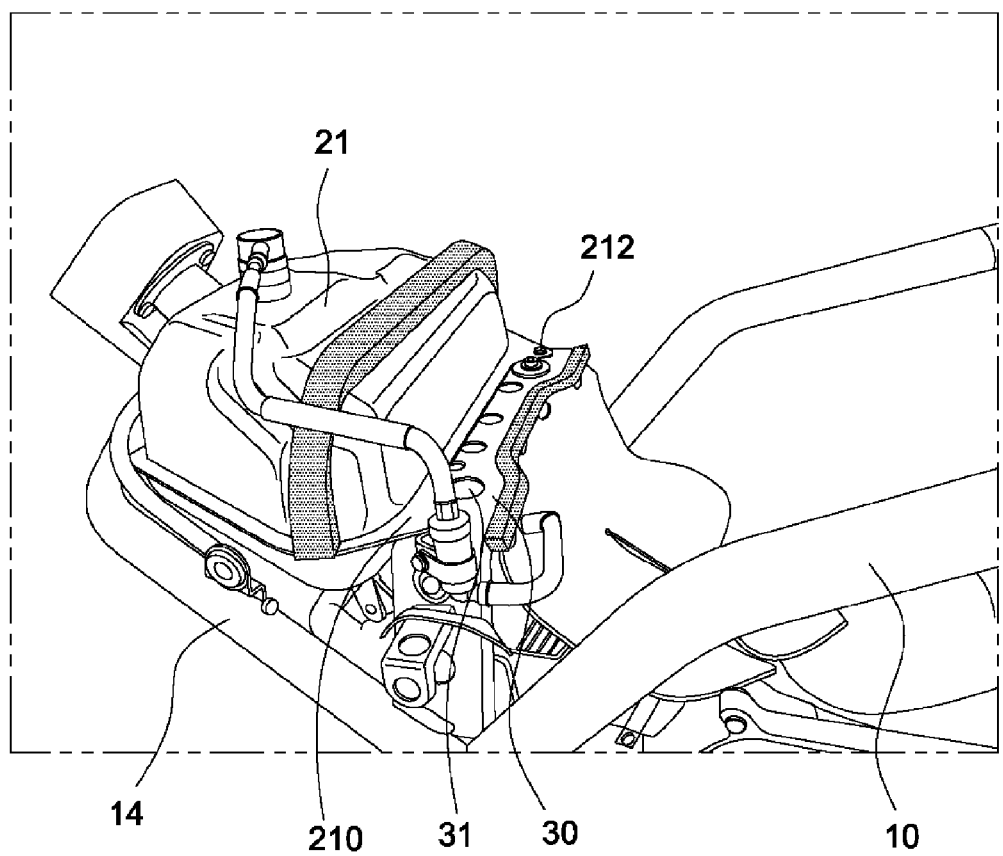
FIG. 4 is a diagram showing the mounting structure of the fuel tank of the motorcycle according to a preferred embodiment of the present invention.

Next, refer to FIG. 4. FIG. 4 is a diagram showing the mounting structure of the fuel tank 21 of the motorcycle 1 according to a preferred embodiment of the present invention. It is a diagram of the mounting structure of the fuel tank 21 viewed from above after the seat 8 and storage box 20 have been removed. As shown in FIG. 4, the fuel tank 21 is supported on the vehicle body 10 with the support of the lateral brace 30. Specifically, the fuel tank 21 includes a junction flange 210 extending around the circumference of its main body. Mounting holes 212 are provided in two projections from the rear end of the junction flange 210 on the left and right sides, respectively, of the vehicle. In addition, two mounting holes (not shown in the figure) corresponding to the two mounting holes 212 are provided on the lateral brace 30. Bolts are passed through the mounting holes 212 in both locations and through the two corresponding mounting holes of the lateral brace 30 and are then secured with nuts. The fuel tank 21 is thus mounted on the lateral brace 30. In addition, the fuel tank 21 can also be mounted on the lateral brace 30 by welding, for example. The front end section of the fuel tank 21 is supported by the projecting frame 14.

As shown in FIG. 3, in the air intake structure of the engine according to a preferred embodiment of the present invention, the air filter 60 that is used to filter the air needed by the engine unit 40 is installed above the engine unit 40. In a preferred embodiment of the present invention, the air filter 60 is installed in the exact position where it can be supported by the engine unit 40 and is mounted on the engine unit 40. However, the mounting position of the air filter 60 is not limited by this type of structure supported by the engine unit 40. The air filter 60 can also meet the overall design needs of the motorcycle 1 by being installed elsewhere on the vehicle body. For example, the air filter 60 can be disposed near the rising-segment frame 17 of the vehicle body frame 10 such that the air filter 60 is supported by the rising-segment frame 17. To make effective use of the installation space of the motorcycle 1, the air filter 60 can complement the sloping direction of the rising-segment frame 17 and thus be formed into a shape that slopes toward the top of the vehicle when viewed from the side.

The air filter 60 includes the air intake hose 61 that draws the air into the air filter 60 to filter and an air delivery hose 62 that connects the air filter 60 and the fuel injection device 50 and delivers the filtered, clean air to the fuel injection device 50. The air filter 60 internally includes a filter unit (not shown in the figure) to remove impurities from the air that has been introduced from outside. In addition, the air filter 60 can be provided with a water drainage outlet 64. For example, it may be installed in the base of the air filter 60 to drain the moisture that condenses in the air inside the air filter 60.

In a preferred embodiment of the present invention, the air intake hose 61 of the air filter 60 is so installed such that it extends from the air filter 60 toward the space between the fuel tank 21 and the storage box 20 and that its air inlet is located between the fuel tank 21 and the storage box 20. Specifically, as shown in FIG. 3, in a preferred embodiment of the present invention, the air intake hose 61 of the air filter 60 extends from the front end section of the air filter 60 roughly toward the front and top of the vehicle for a distance until it reaches the bottom of the space between the fuel tank 21 and the storage box 20 and then continues roughly toward the top of the vehicle and enters the space roughly shaped like a triangle between the fuel tank 21 and the storage box 20, such that the air inlet 63 of the air intake hose 61 is located in the lower half of the space roughly shaped like a triangle between the fuel tank 21 and the storage box 20. Because the left- and right-side vehicle covers 9 cover at least a portion of the storage box 20 and the fuel tank 21 from the left and right sides of the motorcycle 1, they can cover the air inlet 63 of the air intake hose 61. A space that is roughly sealed can be formed through this construction, and the air inlet 63 of the air intake hose 61 can be located exactly in the space enclosed by the fuel tank 21, the storage box 20, and the left- and right-side vehicle covers 9. The muddy water or dust that is sucked into the engine unit 40 through the air inlet 63 can thereby be reduced.

Although the air intake hose 61 can be a hose made from plastic and be shaped to extend in the directions described above, a flexible, variable-shape tube, called a corrugated hose, is preferred. Because corrugated hoses are flexible, an air intake hose 61 that is preferably made from a corrugated hose can be easily disposed to extend as described above. Moreover, while the vehicle is traveling, especially while it is traveling over bumpy road surfaces, it is better able to lengthen, shrink or change shape in response to vehicle vibrations and the swaying of the swing-type engine unit 40 and the rear wheel 7. Thus, it increases the durability of the air intake structure of the engine.

Figure 5:
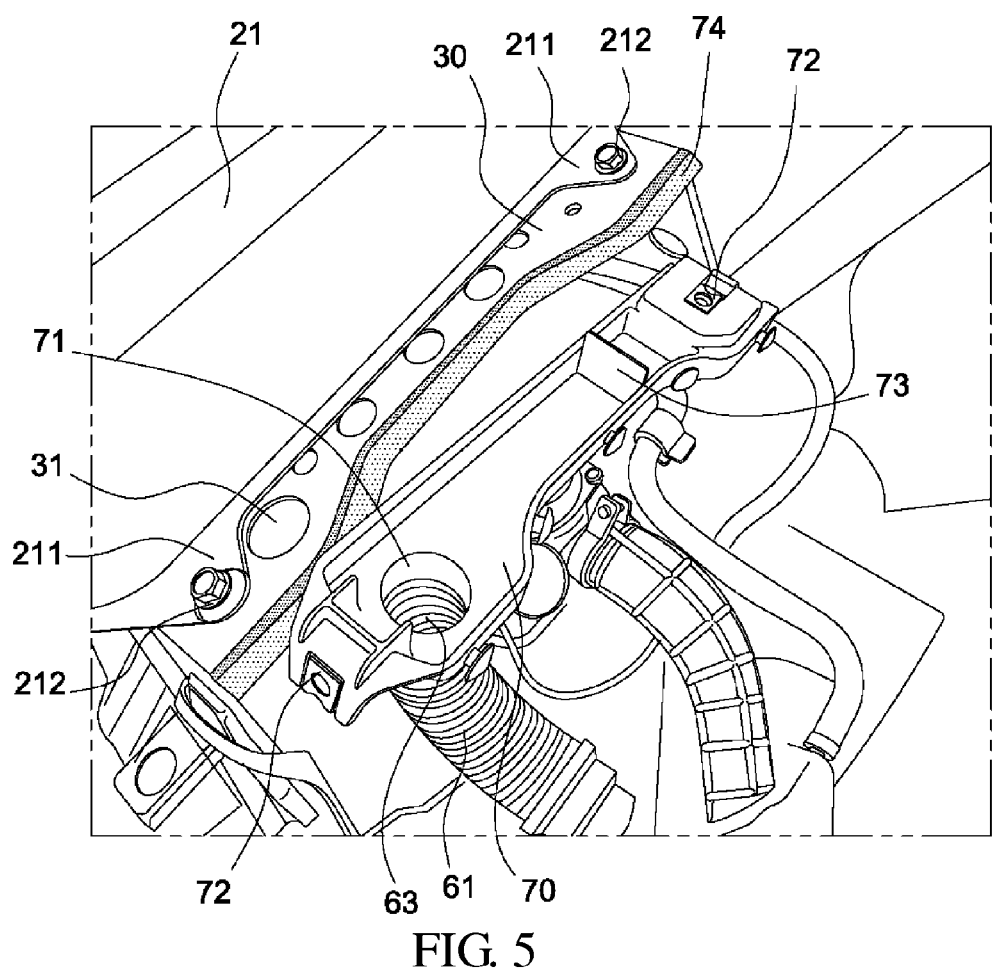
FIG. 5 is a diagram showing the air filter air intake structure of the motorcycle according to a preferred embodiment of the present invention.

Next, please refer to FIG. 5. FIG. 5 is a diagram showing the air filter air intake structure of the engine of the motorcycle according to a preferred embodiment of the present invention. As shown in FIG. 5, the air filter air intake structure according to a preferred embodiment of the present invention can be further provided with a case 70. In the top of the case 70, a hole 71 is opened that has a diameter roughly the same as the diameter of the air intake hose 61. The case 70 is installed at the front end of the air intake hose 61 by surrounding the air inlet 63 of the air intake hose 61, with the result that the air inlet 63 and the hole 71 of the case 70 are joined to make an opening into the space inside the case 70. Thus, the case 70, like the air inlet 63, is located in the space between the fuel tank 21 and the storage box 20.

Furthermore, the case 70 can be joined from below to the lateral brace 30, for example, by welding or gluing the case 70, and thus be mounted on the lateral brace 30. At this point, the air inlet 63 of the air intake hose 61 opens into the space between the lateral brace 30 and the case 70. They are bolted in the present preferred embodiment: bolt holes 32 are provided in each of the two sides, on the left and right of the vehicle, of the lateral brace 30, and bolt holes 72 are provided in each corresponding location of the two sides, on the left and right of the vehicle, of the case 70. The two parts can be truly and conveniently joined by bolting them together with bolts. To be even more specific, in the present preferred embodiment, a bolt hole 32 which, in terms of the left and right of the vehicle, is on the right side of the lateral brace 30 is provided on the right-side top surface of the door-frame-shaped lateral brace 30. A bolt hole 72 is provided on the right-side top surface of the case 70. In addition, because a hole 71 is opened on the left side, in terms of the left and right of the vehicle, of the case 70 in the present preferred embodiment, a bolt hole 72 is provided on the left-side lateral surface of the case 70, and a bolt hole 32 which, in terms of the left and right of the vehicle, is on the left side of the lateral brace 30 is correspondingly provided on the left-side lateral surface of the door-frame-shaped lateral brace 30. However, it is not limited to this. The installation position of the hole 71 can be changed, and the bolt holes 32 and the bolt holes 72 can be correspondingly provided in the respective top surfaces or in the respective lateral surfaces.

As a result of the construction described above, and by causing the air intake hose 61 to extend from air filter 60 toward between the fuel tank 21 and the storage box 20 and positioning the air inlet 63 in the space between the fuel tank 21 and the storage box 20, the present preferred embodiment of the present invention effectively utilizes the space between the fuel tank 21 and the storage box 20 to dispose the air inlet 63 of the air intake hose 61 without compressing the storage space of the storage box 20. Because the space is far from the rear wheel 7 of the motorcycle 1, muddy water or dust sprayed from the back wheel is unlikely to reach the air filter even when the vehicle is travelling at high speeds. Consequently, this unique structural arrangement can truly prevent all kinds of impurities from entering the air filter through the air inlet of the air filter. In particular, the air inlet 63 can be kept in a state that is yet more stable when the construction is as follows: a case 70 surrounding the air inlet 63 is installed at the front end of the air intake hose 61 and the case 70 is mounted on the lateral brace 30 so that the air inlet 63 opens into the space inside the case 70. Moreover, with shielding by the lateral brace 30 and the case 70 from impurities that come from other places, this unique structural arrangement can more effectively prevent impurities from entering through the air inlet.

In addition, in a preferred embodiment of the present invention, the case 70 can be mounted on the lateral brace 30 as described above, and the case 70 can also be mounted on the storage box 20 or mounted on either of, or both of, the left- and right-side vehicle covers 9. To be more specific, an attaching member, such as a hook, can be installed on the rear side, in terms of the front and rear of the vehicle, of the case 70, i.e., on the side facing the storage box 20. And a retaining member to retain the hook can be installed in a corresponding place on the storage box 20. Or an attaching member, such as a hook, can be installed on the sides, in terms of left and right of the vehicle, of the case 70, i.e., one or both sides of the left and right sides facing the left- and right-side vehicle covers 9. Furthermore, retaining members which can be provided to retain the hooks are installed in corresponding places on the left- and right-side vehicle covers 9. Thus, the case 70 can be mounted on the storage box 20 or mounted on one or both of the left- and right-side vehicle covers 9, thereby also achieving the effects of maintaining the air inlet 63 in a stable state and effectively preventing impurities from entering through the air inlet.

In addition, because the case 70 has been roughly shaped so that it is wide in the left-right direction of the vehicle and it is short in the front-rear direction of the vehicle, a rib plate 73 is preferably provided in the case 70 extending in the front-rear direction of the vehicle so as to strengthen the case 70. Therefore, it cannot be easily deformed even if the case 70 is made from lightweight materials in order to reduce the overall weight.

In a preferred embodiment of the present invention, the case 70 can preferably be shaped so as to have an open-face shape that roughly corresponds to the shape of at least a portion of the lateral brace 30 when the vehicle is viewed from above. By having the roughly corresponding shapes between the case 70 and the lateral brace 30 complement each other, it is possible to provide a roughly sealed space from the space between the case 70 into which the air inlet 63 opens and the lateral brace 30. Thereupon, at least one ventilation hole 31 used for ventilation is provided on the lateral brace 30. The ventilation hole 31 can be used to connect the roughly sealed space between the case 70 and the lateral brace 30 to external air so as to enable external air to pass through the ventilation hole 31 into the sealed space and then enter the air intake hose 61 through the air inlet 63. The air is thereupon introduced into the air filter 60.

In a preferred embodiment of the present invention, the case 70 and the lateral brace 30 preferably define a shape whose left and right end portions on the left and right sides of the vehicle are wider and whose middle portion is narrower when the vehicle is viewed from above. By so shaping the lateral brace 30, it is possible, on the one hand, to bore in the wider left and right end portions two mounting holes corresponding to the mounting holes 212 on the rear end of the fuel tank 21. On the other hand, the middle portion of the lateral brace 30 is designed to have a narrow shape so as to reduce its weight.

According to a preferred embodiment of the present invention, as a result of the structure described above and by forming the junction sides of the lateral brace 30 and the case 70 into roughly corresponding shapes, can provide the space between the lateral brace 30 and the case 70 into which the air inlet 63 opens into a roughly sealed space and can introduce air through the ventilation hole 31 provided on the lateral brace 30. Therefore, this unique structural arrangement is better able to truly prevent various impurities that come from below from entering the air filter through the air inlet.

In addition, a liner 74 preferably made from sponge or plastic can be installed at the rear end, in terms of the vehicle front and rear, of the lateral brace 30. Thus, after the case is mounted on the vehicle body frame 10, the liner 74 eliminates gaps that might be produced between the lateral brace 30 and the case.

Figure 6:
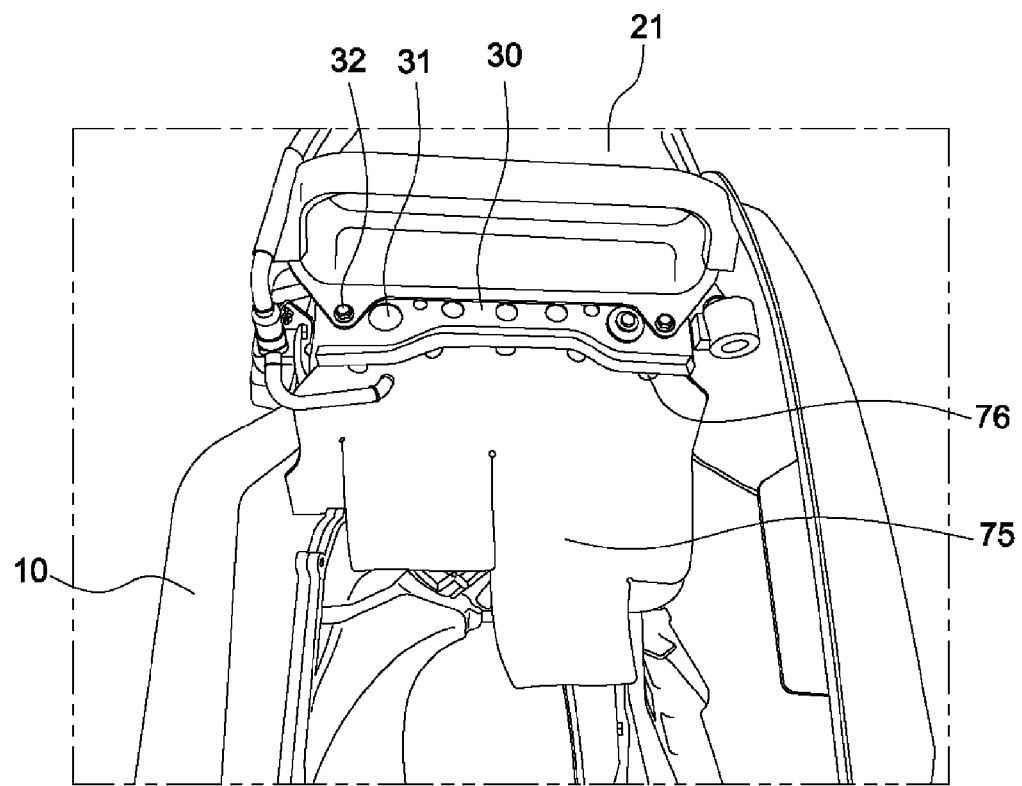
FIG. 6 is a diagram showing a dust proof rubber pad in an air intake structure of an air filter according to a preferred embodiment of the motorcycle of the present invention.
Figure 7:
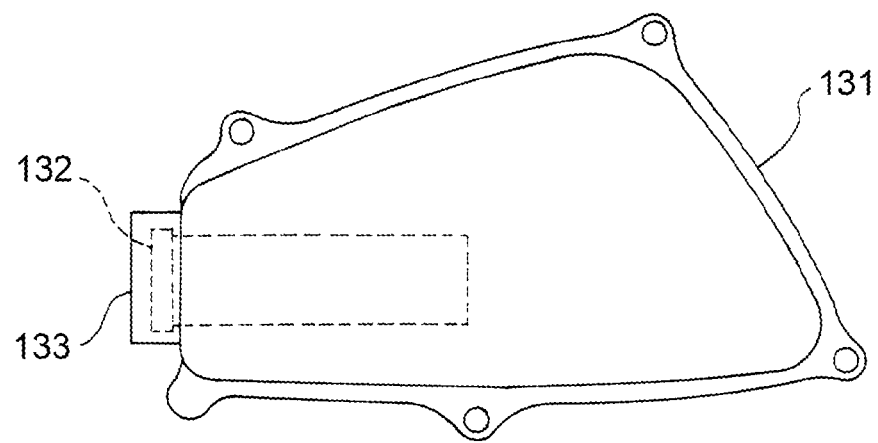
FIG. 7 is a diagram showing the air intake structure of an air filter of a conventional motorcycle.
Figure 8:
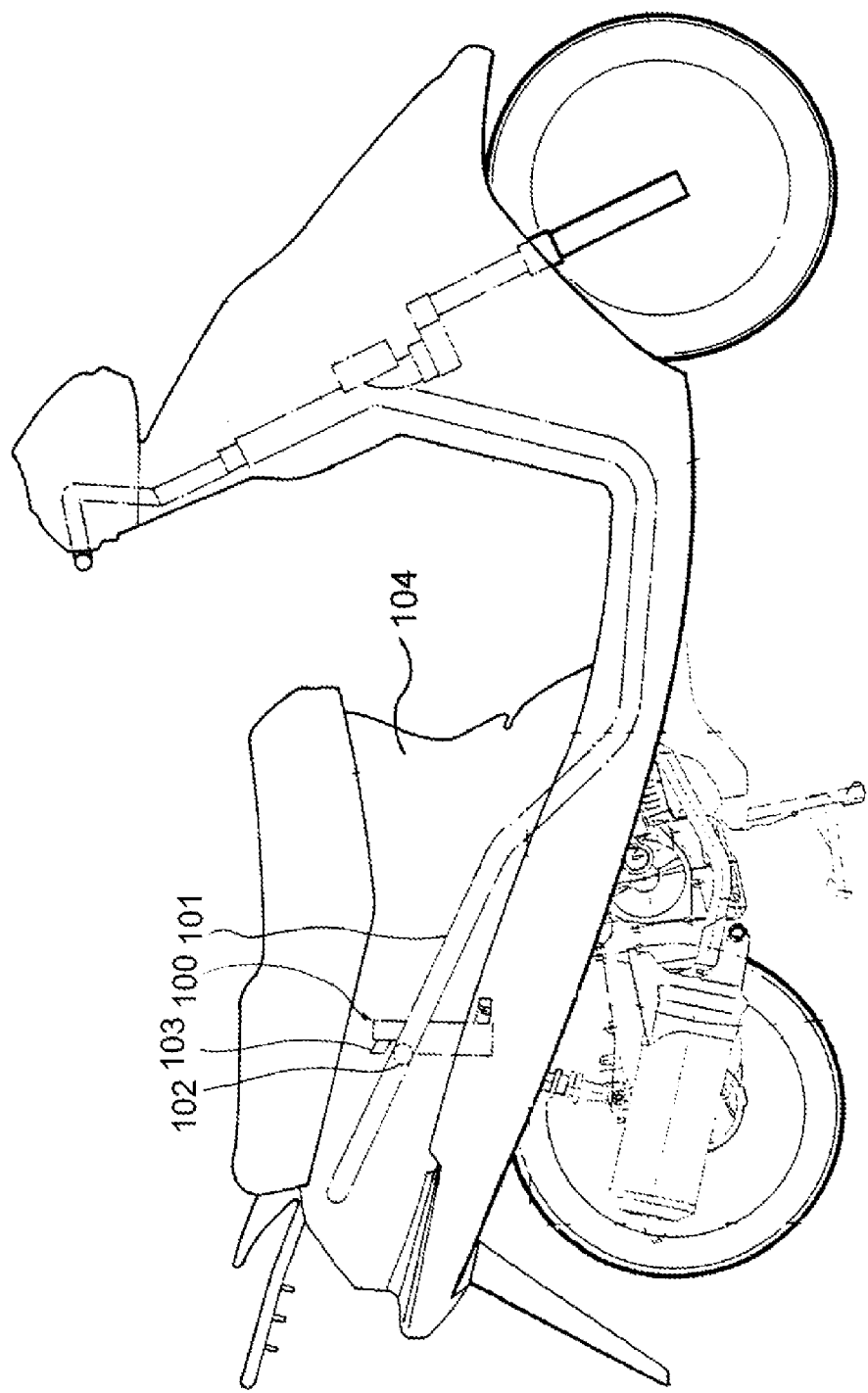
FIG. 8 is a diagram showing the air intake structure of an air filter of another conventional motorcycle.

FIG. 6 is a diagram showing a dust proof rubber pad 75 in the air filter air intake structure of the motorcycle according to a preferred embodiment of the present invention. As shown in FIG. 6, in a preferred embodiment of the present invention, the dust proof rubber pad 75 preferably is further installed at the rear end, in terms of the front and rear of the vehicle, of the case 70. The dust proof rubber pad 75 makes use of thin pieces made from rubber, for example, which hang down from the case 70 by being suspended from the rear end of the case 70. Because the dust proof rubber pad 75 includes thin pieces made from rubber, it can flex in response to deformations of the internal space of the motorcycle 1 and can easily be installed in the limited and complex space of the motorcycle 1 behind and below the case 70. It will not deprive other parts of their installation space or the storage box 20 of its storage space. In a preferred embodiment of the present invention, multiple flat-headed pegs 76 are provided on the rear end of the case 70. These flat-headed pegs 76 are used for convenient hanging of the dust proof rubber pad 75 from the rear end of the case 70. In addition, the flat-headed pegs 76 may be replaced by hooks, or the dust proof rubber pad 75 may be installed on the case 70 by gluing or nailing.

By adding the dust proof rubber pad 75 to the rear end of the case 70, the present preferred embodiment of the present invention is better able to effectively block various impurities sprayed from the rear wheel and originating from the rear of the vehicle and can better prevent various impurities from entering through the air inlet.

The technical content and the technical features of various preferred embodiments of the present invention have been disclosed above. However, persons who are skilled in the art still may, based on the instructions and disclosures of preferred embodiments of the present invention described above, devise various substitutions and modifications that do not depart from the spirit of the present invention. Therefore, the protective scope of the present invention shall not be limited to the scope disclosed in the preferred embodiments, but shall include all substitutions and modifications that do not depart from the present invention and shall be covered by the claims below.

What is claimed is:

1. A motorcycle comprising:
   a vehicle body frame that extends in a front-rear direction of the vehicle;
   an engine unit that is suspended on the vehicle body frame and generates power that drives the motorcycle;
   a seat that is supported by the vehicle body frame and that provides seating for a rider;
   a storage box that is disposed below the seat;
   a fuel tank that stores fuel needed by the engine unit;
   left and right side vehicle covers that are disposed on left and right sides of the motorcycle and cover at least a portion of the storage box from the left and right sides of the motorcycle; and
   an air filter that is disposed above the engine unit to filter air needed by the engine unit, and includes an air intake hose to introduce air into the air filter; wherein
   the fuel tank is disposed below the seat and is located in front of the storage box;
   the fuel tank is mounted on the vehicle body frame; and
   the air intake hose extends from the air filter toward an area between the fuel tank and the storage box such that an air inlet of the air intake hose is configured to draw air into the air filter and is located directly behind the fuel tank, directly in front of the storage box, and between the left and right side vehicle covers.

2. The motorcycle as described in claim 1, wherein the vehicle body frame includes left and right side vehicle frames located on the left and right sides, respectively, of the motorcycle and extending in the front-rear direction of the vehicle and a lateral brace connecting the left and right side vehicle frames and being supported by the left and right side vehicle frames, the fuel tank being mounted on the lateral brace.

3. The motorcycle as described in claim 2, further comprising a case mounted on the lateral brace, the air intake hose being supported by the case, and the air inlet opening into a space between the lateral brace and the case.

4. The motorcycle as described in claim 3, wherein a top portion of the case has an open-face shape that substantially corresponds to a shape of at least a portion of the lateral brace when the motorcycle is viewed from above, and at least one ventilation hole for ventilation is provided on the lateral brace.

5. The motorcycle as described in claim 4, wherein shapes of the case and the lateral brace define a shape having left and right end portions on the left and right sides of the motorcycle that are wider than a middle portion when the motorcycle is viewed from above.

6. The motorcycle as described in claim 1, further comprising a case mounted on the storage box, the air intake hose being supported by the case, and the air inlet opening into a space inside the case.

7. The motorcycle as described in claim 1, further comprising a case mounted on at least one of the left and right side vehicle covers, the air intake hose is supported by the case, and the air inlet opening into a space inside the case.

8. The motorcycle as described in claim 3, further comprising a dust proof rubber pad arranged behind the case and to hang from the case.

9. The motorcycle as described in claim 3, wherein a rib plate is arranged in the case to extend in the front-rear direction of the vehicle.

10. The motorcycle as described in claim 1, wherein the storage box is disposed directly below the seat, and the fuel tank is disposed directly below the seat.

* * * * *